United States Patent
Su et al.

(10) Patent No.: US 7,163,727 B2
(45) Date of Patent: Jan. 16, 2007

(54) MULTI-LAYER BARRIER FILM STRUCTURE

(75) Inventors: Tien-Kuei Su, Saunderstown, RI (US); Keunsuk P. Chang, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 245 days.

(21) Appl. No.: 10/690,709

(22) Filed: Oct. 23, 2003

(65) Prior Publication Data

US 2005/0089682 A1   Apr. 28, 2005

(51) Int. Cl.
*B29D 22/00* (2006.01)
(52) U.S. Cl. .................. 428/35.7; 428/36.92; 427/384
(58) Field of Classification Search ............ 428/36.92, 428/35.7; 427/384
See application file for complete search history.

(56) References Cited

U.S. PATENT DOCUMENTS

| | | | | |
|---|---|---|---|---|
| 5,275,853 | A | * | 1/1994 | Silvis et al. ............... 428/35.4 |
| 5,962,093 | A | * | 10/1999 | White et al. ............... 428/35.2 |
| 6,146,574 | A | * | 11/2000 | Henkee et al. ............. 264/241 |
| 6,589,621 | B1 | * | 7/2003 | Beckerdite et al. ...... 428/36.92 |

\* cited by examiner

*Primary Examiner*—Ieszek B. Kiliman
(74) *Attorney, Agent, or Firm*—Morrison & Foerster LLP

(57) ABSTRACT

A laminate film comprising a polyetheramine resin-containing layer on a first polyolefin resin-containing layer or a first polyethylene terephthalate resin-containing layer is disclosed. The laminate film could further have additional layers such as a second polyolefin resin-containing layer, a second polyethylene terephthalate resin-containing layer, a metal layer or combinations thereof.

44 Claims, No Drawings

MULTI-LAYER BARRIER FILM STRUCTURE

FIELD OF INVENTION

This invention relates to a biaxially oriented film comprising a polyolefin or polyester layer, a layer of epoxyamine polymer contiguously formed on one side of the polyolefin or polyester layer, and an optional contiguous polyolefin or copolyester layer formed on the polyolefin or polyester layer side opposite the epoxy-amine polymer. This invention exhibits exceptional gas barrier characteristics over a polyolefin or polyester film alone, rivals the gas barrier of EVOH-containing polyolefin films without the need for adhesion promoters or tie-layers, and the epoxyamine layer exhibits a high surface energy suitable for printing, metallizing, adhesive laminations and coatings without the need for additional discharge-treatment to provide this functionality. This invention is also contemplated as a basefilm for metallizing wherein the epoxy-amine polymer layer serves as a metal adhesion layer.

BACKGROUND OF INVENTION

Ethylene vinyl alcohol copolymers (EVOH) show excellent oxygen and flavor barrier properties at low humidity, typically in the range of 0 to 60%. However, its barrier property deteriorates dramatically under high humidity conditions when the humidity is in the range of 75 to 90%. In fact, due to the polar nature of EVOH, such films made with EVOH generally exhibit poor moisture barrier. Therefore, EVOH is typically laminated with polyolefins on both sides to provide barrier properties for practical packaging applications in order to protect the EVOH from humidity effects. Moreover, EVOH is relatively brittle and difficult to stretch, tending to form cracks during stretching in biaxial orientation processes, for example, due to its crystalline nature. In biaxial orientation processes, EVOH grades that are suitable for stretching are typically limited to 48 mole % ethylene content. Lower ethylene content EVOH grades—which often exhibit better gas barrier properties—are unusable in orientation processes due to the brittle nature of these materials and will crack or fracture under the stretching forces involved. Another disadvantage of EVOH materials is that they require the use of costly adhesion promoters and/or tie-layer resins in order for them to bond adequately to polyolefin or polyester substrates. Without such tie resins, EVOH materials or related materials like polyviny alcohol (PVOH), tend to peel off easily from the polyolefin or polyester substrate resulting in loss of barrier properties and poor appearance. As a consequence of using these tie layer materials, the product cost of such a multilayer film or laminated increases due to these expensive resins and also due to capital expenditures to add multi-layer (3 or 4 or more) compositing dies for film orientation or extrusion coating.

U.S. Pat. No. 4,650,721 describes a process to improve the otherwise poor bonding of EVOH or PVOH in oriented films through the use of tie resins, namely maleic anhydride acid grafted polyolefins.

U.S. Pat. No. 5,153,074 teach a metallized oriented multilayer film design of EVOH and blends of a maleic anhydride modified propylene homopolymer or copolymer as the substrate to which the EVOH is contiguously adhered. The EVOH layer is used as a metallizing surface for the vapor deposition of aluminum. Again, the use of an adhesion promoting material is essential in this invention. It is known that EVOH is relatively hard to stretch compared to polypropylene. Consequently, only limited grades of EVOH like the one with 48 mole % of ethylene can be co-processed with OPP without forming any surface defects. Using lower ethylene mole % EVOH (e.g. 44% or 38%) in biaxial orientation causes surface defects like stress fractures or process issues like film breaks due to the higher crystallinity of the EVOH.

U.S. Pat. No. 5,175,054 teaches the solution coating of a mixture of solution-grade EVOH or PVOH containing about 80% of vinyl alcohol and aqueous dispersion-grade of the ionomer of the alkali salt of ethylene-methacrylic acid copolymer. This coating is applied to an oriented polymer substrate and subsequently metallized. In this invention, the ionomer acts as an adhesion promoter to assure adequate adhesion of the EVOH or PVOH to the polyolefin (polypropylene) substrate which is otherwise poor without the presence of the ionomer.

This invention seeks to avoid some of the disadvantages of EVOH containing laminate films.

SUMMARY OF THE INVENTION

One embodiment is a laminate film comprising a polyetheramine resin-containing layer on a first polyolefin resin-containing layer. Preferably, the polyetheramine resin-containing layer is directly on the first polyolefin resin-containing layer and there is no tie layer between the polyetheramine resin-containing layer and the first polyolefin resin-containing layer. The laminate could further comprise a second polyolefin resin-containing layer on the first polyolefin resin-containing layer. Preferably, the polyetheramine resin is a copolymer of bis-phenol A diglycidyl ether and resorcinol diglycidyl ether with ethanolamine while the first polyolefin resin-containing layer comprises a propylene homopolymer. Preferably, the second polyolefin resin-containing layer comprises a heat sealable polyolefin selected from the group consisting of polypropylene copolymers, terpolymers, polyethylene and combinations thereof.

In another variation, the heat sealable layer comprises an antiblock component selected from the group consisting of amorphous silicas, aluminosilicates, sodium calcium aluminum silicate, a crosslinked silicone polymer, and polymethylmethacrylate. Preferably, the first polyolefin resin-containing layer is a discharge-treated polyolefin resin-containing layer while the second polyolefin resin-containing layer comprises a winding layer comprising a crystalline polypropylene and an inorganic antiblocking agent. Preferably, the second polyolefin resin-containing layer comprises a winding layer comprising a matte layer of a block copolymer blend of polypropylene and one or more other polymers, the matte layer having a roughened surface while the winding layer is a discharge treated winding layer having a surface for lamination or coating with adhesives or inks. Preferably, the winding layer comprises an antiblock component selected from the group consisting of amorphous silicas, aluminosilicates, sodium calcium aluminum silicate, a crosslinked silicone polymer, and polymethylmethacrylate. Further preferably, the polyetheramine resin-containing layer is a discharge-treated polyetheramine resin-containing layer. In one variation, the discharge-treated polyetheramine resin-containing layer has a discharge-treated surface formed in an atmosphere of $CO_2$ and $N_2$. The laminate film could further comprise a vacuum deposited metal layer on the polyetheramine resin-containing layer. Preferably, the metal layer has a thickness of about 5 to 100 nm, has an optical density of about 1.5 to 5.0, and comprises aluminum. In one variation, the laminate film is an extruded laminate film.

Another embodiment is a laminate film comprising a polyetheramine resin-containing layer on a polyethylene terephthalate resin. Preferably, the polyetheramine resin-containing layer is directly on the first polyethylene terephthalate resin-containing layer with no tie layer between the polyetheramine resin-containing layer and the first polyethylene terephthalate resin-containing layer. The laminate film could further comprise a second polyethylene terephthalate resin-containing layer or an amorphous copolyester layer on the first polyethylene terephthalate resin-containing layer. In one variation, the second polyethylene terephthalate resin containing layer or the amorphous copolyester layer comprises an antiblock component selected from the group consisting of amorphous silicas, aluminosilicates, sodium calcium aluminum silicate, a crosslinked silicone polymer and polymethylmethacrylate. In anther variation, the polyetheramine resin-containing layer is a discharge-treated polyetheramine resin-containing layer. Preferably, the discharge-treated polyetheramine resin-containing layer has a discharge-treated surface formed in an atmosphere of $N_2$ and $CO_2$. The laminate film could further comprise a vacuum-deposited metal layer on the polyetheramine resin-containing layer. Preferably, the metal layer has a thickness of about 5–100 nm, an optical density of 1.5–5.0, and comprises aluminum.

Another embodiment is a method for flexible packaging comprising obtaining a laminate film comprising a polyetheramine resin-containing layer on a first polyolefin resin-containing layer and surrounding a product by the laminate film. Another embodiment is a method for flexible packaging comprising obtaining a laminate film comprising a polyetheramine resin-containing layer on a polyethylene terephthalate resin-containing layer and surrounding a product by the laminate film. Preferably, the product is a food product.

In yet another embodiment, this invention provides biaxially oriented polyolefin or polyester multi-layer films with a skin of polyetheramine to enhance barrier and printing properties for flexible packaging purposes. Another embodiment provides a metallized biaxially oriented polyolefin or polyester multi-layer barrier films. An additional embodiment provides laminate structures of polyolefin layers and polyetheramine layers for barrier applications in flexible packaging.

Another embodiment is a laminate film comprising a polyetheramine resin-containing layer on a mixed resin layer comprising a polyethylene terephthalate resin and a polyolefin resin, wherein preferably the polyolefin resin is a polypropylene but could also be a heat sealable polyolefin such as polypropylene copolymers, terpolymers, polyethylene and combinations thereof. The mixed resin layer could further comprise a compatibilizer that provides compatibility between the polyethylene terephthalate resin and the polyolefin resin. The compatibilizer could be a polymer having polyolefin molecules and polyethylene terephthalate molecules within the polymer, preferably at the two ends of the polymer chain. In one variation, the mixed resin layer could further comprise an antiblock component such as amorphous silicas, aluminosilicates, sodium calcium aluminum silicate, a crosslinked silicone polymer and polymethylmethacrylate.

This invention provides a method to improve the barrier of biaxially oriented films and metallized films resulting in a high barrier packaging film with excellent gas barrier properties. The invention helps solve the problem associated with the prior art of surface defects, processability issues, and limitations of using lower ethylene content EVOH in biaxial orientation. Additionally, this invention allows the use of more economical laminate film structures by avoiding the use of intermediate tie resin layers or blends of tie resins in conjunction with lower cost substrates.

The laminate film of the invention includes at least a 2-layer laminate film wherein the core layer or substrate layer is an oriented film, either monoaxially or biaxially, the preferred being biaxially oriented. This core or substrate layer may be comprised of polyolefins such as propylene homopolymer, ethylene homopolymer, copolymers of propylene and ethylene, copolymers of butylene and propylene, terpolymers of ethylene, propylene and butylene, or blends thereof; or polyethylene terephthalate. A skin layer of polyetheramine is applied contiguously upon at least one of the surfaces of the substrate layer. The method of applying the polyetheramine layer to the substrate layer can be of various means well known in the art, such as solution coating an aqueous solution of the polyetheramine resin onto the substrate layer by means of a coating roll (e.g. gravure roll) or other coating means, and drying of the coating. Another method is to employ extrusion coating of the polyetheramine onto the substrate whereby a molten stream of the polyetheramine is coated onto the substrate by means of a die. Another method is to coextrude the polyetheramine along with the substrate or core layer through a compositing die whereupon the molten multilayer film structure is quenched upon a chilled casting roll system or casting roll and water bath system. It is also contemplated to produce a laminate structure in which the polyetheramine layer is sandwiched between two outer film substrates (which may be multilayer structures themselves). The outer film substrates may be the same in composition or not; the polyetheramine in this case can be thought of as a laminating adhesive adhering the two outer substrates together. All these examples can also be metallized via vapor-deposition, preferably a vapor-deposited aluminum layer, with at least an optical density of about 1.5, preferably with an optical density of about 2.0 to 4.0, and even more preferably between 2.3 and 3.2.

Optionally, an additional layer of a heat sealable surface or a winding surface containing antiblock and/or slip additives for good machinability and low coefficient of friction (COF) can be disposed on the polyolefin or polyester substrate layer, opposite the side with the polyetheramine layer. Additionally, if this third layer is used as a winding surface, its surface may also be modified with a discharge treatment to make it suitable for laminating or converter applied adhesives and inks.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION OF THE INVENTION

U.S. Pat. No. 5,472,753 discloses a polyetheramine-containing laminate structure for beverage bottles. The disclosure of this patent is incorporated herein by reference.

It has been found that by using epoxy-amine polymers (aka polyetheramine, polyhydroxy amino ether) in a contiguous layer formed upon a polyolefin or polyester film substrate results in a multilayer film structure exhibiting superior gas barrier properties and an exceptionally high surface energy. Unlike EVOH or related materials such as PVOH, however, no tie-layer or adhesion promoting materials such as anhydride-grafted polyolefins are required to bond the polar layer to such a polyolefin or amorphous copolyesters or primers to a polyethylene terephthalate film substrate. Adequate adhesion of the polyetheramine is found without the need of such intermediate adhesion promoting layers or tie resins. Thus, product cost can be reduced as expensive tie-layers and capital for specialty multi-layer compositing dies can be avoided. Moreover, because of the amorphous nature of polyetheramine, biaxial orientation of a layer of polyetheramine upon the polyolefin or polyester substrate is easily achieved, with no attendant cracking or peeling of the polyetheramine under stretching forces and temperatures. In addition, because of the high hydroxyl content of the polyetheramine composition, such a layer's surface energy is sufficiently high enough that no discharge-treatment method is required post-film-forming. This inherently high surface energy makes it readily suitable as a printing, metallizing, coating, or laminating surface. However, like EVOH, polyetheramine is sensitive to humidity in that high humidity conditions can negatively impact its gas barrier properties. Thus, like EVOH, polyetheramine should be protected against humidity effects if used as part of a multilayer film or laminate, whereby the polyetheramine layer should be buried between other layers or by a metal coating such as vapor-deposited metal.

Phenoxy-type thermoplastics, including polyhydroxy ether, polyhydroxy ester ethers, and polyhydroxy amino ethers, are described in the literature such as *Polymer Preprints*, 34(1), 904–905 (1993). Polyhydroxy amino ether (PHAE), also called polyetheramine, is an epoxy-based thermoplastic. Its repeating unit is composed of aromatic ether and ring or linear amine in the backbone chain, and hydroxyl groups in the pendants from the opening of the epoxy groups. The basic PHAE is made of bis-phenol A diglycidyl ether (BADGE) and ethanol amine. Property modification can be achieved by copolymerization of BADGE and resorcinal diglycidyl ether (RDGE) with ethanol amine which improves gas barrier properties.

U.S. Pat. No. 5,275,853 describes the composition and process of making polyetheramine. The polyetheramine for the laminate film of this invention could be made by the process of U.S. Pat. No. 5,275,853.

In one embodiment of the invention, the laminate film comprises: an isotactic polypropylene resin layer with one side discharge-treated for high surface energy suitable for printing or coating, a heat sealable ethylene-propylene-butylene terpolymer layer coextruded onto one side of the core layer opposite the discharge-treated surface; and a polyetheramine layer coated onto the discharge-treated surface of the polypropylene resin layer.

The polypropylene resin layer is a crystalline polypropylene of a specific isotactic content and can be uniaxially or biaxially oriented. Crystalline polypropylenes are generally described as having an isotactic content of about 90% or greater. Suitable examples of crystalline polypropylenes for this invention are Fina 3270 and ExxonMobil PP4772. These resins also have melt flow rates of about 0.5 to 5 g/10 min, a melting point of about 163–167° C., a crystallization temperature of about 108–126° C., a heat of fusion of about 86–110 J/g, a heat of crystallization of about 105–111 J/g, and a density of about 0.90–0.91. The core resin layer is typically 5 μm to 50 μm in thickness after biaxial orientation, preferably between 10 μm and 25 μm, and more preferably between 12.5 μm and 17.5 μm in thickness. Additionally, a small amount of inorganic antiblocking agent may be optionally added up to 1000 ppm to this resin layer. Preferably 300–500 ppm of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1–12 μm, preferably in the range of 2–6 μm.

The polypropylene resin layer can be surface treated with either a corona-discharge method, flame treatment, atmospheric plasma, or corona discharge in a controlled atmosphere of nitrogen, carbon dioxide, or a mixture thereof. The latter treatment method in a mixture of $CO_2$ and $N_2$ is preferred. This method of discharge treatment results in a treated surface that comprises nitrogen-bearing functional groups, preferably 0.3% or more nitrogen in atomic %, and more preferably 0.5% or more nitrogen in atomic %. This treated core layer can then be metallized, printed, coated, or extrusion or adhesive laminated.

A heat sealable layer or non-heat sealable layer may be coextruded with the core layer opposite the polar resin layer having a thickness after biaxial orientation between 0.2 and 5 μm, preferably between 0.6 and 3 μm, and more preferably between 0.8 and 1.5 μm. The heat sealable layer may contain an anti-blocking agent and/or slip additives for good machinability and a low coefficient of friction in about 0.05–0.5% by weight of the heat-sealable layer. The heat sealable layer will be a copolymer of propylene, either ethylene-propylene or butylene-propylene, and preferably comprise a ternary ethylene-propylene-butene copolymer. If the invention comprises a non-heat sealable, winding layer, this layer will comprise a crystalline polypropylene with antiblocking and/or slip additives or a matte layer of a block copolymer blend of polypropylene and one or more other polymers whose surface is roughened during the film formation step so as to produce a matte finish on the winding layer. Preferably, the surface of the winding layer is discharge-treated to provide a functional surface for lamination or coating with adhesives and/or inks.

The coextrusion process includes a three-layered compositing die. The polymer core layer is sandwiched between the polar resin layer and the heat sealable or winding layer. The three layer laminate sheet is cast onto a cooling drum whose surface temperature is controlled between 20° C. and 60° C. to solidify the non-oriented laminate sheet. The non-oriented laminate sheet is stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to give a biaxially oriented sheet. The biaxially oriented film has a total thickness between 6 and 40 µm, preferably between 10 and 20 µm, and most preferably between 12 and 18 µm.

The polyetheramine layer is aqueous solution-coated onto the discharge-treated side of the polypropylene resin layer. The % solids of the aqueous solution is from 10–50%, preferably 15–40%, and more preferably 25–35% with a viscosity of less than 50 cps. After drying, the dry coating weight of the polyetheramine layer is 0.5–5 mg/in$^2$, preferably 1.0–3.0 mg/in$^2$, and more preferably 1.5–2.5 mg/in$^2$. Suitable type of polyetheramine is that obtainable from Dow Chemicals under the tradename "BLOX." In particular, BLOX 5000 series grade is suitable for solution coating. The resulting clear film was tested for gas barrier properties and adhesion of the coating to the polypropylene substrate. The aqueous coating can be applied either "in-line" or "out-of-line." In an "in-line" coating, the coating station is located after the machine direction stretching process of a monoaxial or biaxial orientation process and dried in a drying oven or using the tenter oven preheating zones as a dryer. In the case of biaxial orientation, the coated monoaxially stretched film is then stretched in the transverse direction. An advantage of this process is that the orientation and coating of the invention can be essentially done in one processing step. It is often beneficial to in-line discharge treat the monoaxial substrate prior to the coating station in order that the aqueous solution adequately "wets" the substrate surface for consistent coating weight, drying, and appearance. In an "out-of-line" coating process, the finished monoaxial or biaxial film is wound up in a roll form, and is mounted on a separate coating machine. Again, the monoaxial or biaxial film substrate should have the desired surface for coating with the polyetheramine solution discharge-treated in order that the solution adequately wets the surface. This separate coating line will then apply the solution, dry it, and rewind the finished product.

The polyetheramine resin can also be extrusion-coated onto the polymer substrate rather than solution-coated. Dow Chemical BLOX grades for extrusion-coating that are suitable include but are not limited to BLOX 4000 series and 0000 series. Similar to the solution-coating method, the extrusion-coating can be done either in-line—whereby the extrusion coating station is located after the first direction stretching process onto the monoaxially oriented film—or out-of-line whereby the extrusion-coating process is done on a separate machine onto the monoaxially or biaxially stretched substrate. It may also be desirable for the substrate to have the surface designated for coating to be discharge-treated in order that adequate adhesion of the BLOX coating is obtained.

The polyetheramine layer may also be applied via coextrusion with the substrate layer. In this case, a compositing die is used to combine the melt streams of the polyetheramine extrudate with the substrate extrudate which is either a polyolefin of polyester. In this case, no discharge-treatment of the substrate is necessary as enough intermolecular mixing at the interface of the polyetheramine extrudate and substrate extrudate assures adequate bonding of the two layers. This coextrudate can then be cast onto a chill roll, quenched, then monoaxially or biaxially stretched into the final film product. The coextruded polyetheramine skin resin layer in this case has a thickness between 0.2 and 2 µm, preferably between 0.5 and 1.5 µm, more preferably 1 µm, after biaxial orientation.

A preferred embodiment is to metallize the surface of the polyetheramine layer. The unmetallized laminate sheet is first wound in a roll. The roll is placed in a metallizing chamber and the metal vapor-deposited on the polyetheramine resin layer surface. The metal film may include titanium, vanadium, chromium, manganese, iron, cobalt, nickel, copper, zinc, aluminum, gold, or palladium, the preferred being aluminum. The metal layer shall have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture permeability, optical density, metal adhesion, and film durability.

This invention will be better understood with reference to the following examples, which are intended to illustrate specific embodiments within the overall scope of the invention.

EXAMPLE 1

A 2-layer coextrusion article comprising a core layer of a polypropylene resin with one surface discharge-treated and, upon the opposite surface, a layer of a terpolymer sealant is disposed, was coated with a solution of polyetheramine resin. The total thickness of this film substrate after biaxial orientation is 70 G or 0.7 mil. The thickness of the respective core and sealant skin layers after biaxial orientation is 64–66 G and 4–6 G. The core is comprised of polypropylene and 300 ppm of antiblock additive such as silica of about 6 µm in average particle size. The core layer is melt extruded at 450–550° F. where the propylene homopolymer is Exxon-Mobil PP4772. The sealant layer comprises an ethylene-propylene-butylene terpolymer such as Sumitomo SPX78H8 and 4000 ppm of an inorganic antiblock additive such as Toshiba Tospearl 120, a crosslinked silicone polymer of nominal 2.0 um particle size and is melt extruded at 400–480° F. The 2-layer coextrudate was passed through a flat die to be cast on a chill drum of 100–180° F. The formed cast sheet was passed through a series of heated rolls at 210–270° F. with differential speeds to stretch in the machine direction (MD) from 4 to 6 stretch ratio, followed by transverse direction (TD) stretching from 8 to 10 stretch ratio in the tenter oven at 310–350° F. The film was then discharge treated on the propylene homopolymer core layer surface and wound into roll form. This polypropylene substrate roll was then place on a coating machine and the discharge-treated surface was coated via a gravure roll with a BLOX 5000 series aqueous solution, which has about 50% co-monomer of RDGE. The BLOX solution comprises the epoxy-amine polymer dispersed in water. The % solid in water was about 15–38% and the solution viscosity less than 50 cps. The BLOX-coated substrate was passed through a drying oven to achieve a dry coating weight of about 2 mg/in$^2$ or about 2.5 µm in thickness. The dried coating had a $T_g$ ranging from 50 to 80° C. The coated and dried resultant clear film was tested for properties and was then metallized by vapor deposition of aluminum under vacuum to an optical density of 2.3 and tested for properties.

EXAMPLE 2

A process similar to Example 1 was repeated except that the substrate film for coating of the BLOX polyetheramine resin was a monolayer oriented polyethylene terephthalate film (no amorphous copolyester used) of nominal 48 G or 0.48 mil. The clear and metallized films were tested for properties.

EXAMPLE 3

A 3-layer coextrusion article comprising a core layer of propylene homopolymer ExxonMobil PP4772, a sealant layer of Sumitomo SPX78H8, and a skin layer coextruded on the side of the core layer opposite the sealant layer of polyetheramine resin BLOX XU 19061 was made. The extrusion temperature of the core polypropylene layer was 480° F., the extrusion temperature of the sealant layer was 450° F., and the extrusion temperature of the polyetheramine layer was 400° F. These were coextruded out of a flat compositing die and cast onto a chill roll set at 120° F. The cast sheet was oriented in the machine direction at 5 times its original length, and then oriented at 8 times its original width. The resultant film after orientation was 120 G or 1.2 mil in thickness, with the core layer approximately 102 G thick, the sealant layer approximately 6 G thick, and the polyetheramine layer approximately 12 G thick. The resultant clear film was then tested for properties and was then metallized by vapor deposition of aluminum under vacuum to an optical density of 2.3 and tested for properties.

COMPARATIVE EXAMPLE 1

A process similar to Example 1 was repeated except that no polyetheramine solution coating was applied.

COMPARATIVE EXAMPLE 2

A process similar to Example 2 was repeated except that no polyetheramine solution coating was applied.

COMPARATIVE EXAMPLE 3

A 3-layer coextrusion article comprises a core layer of a blend of polypropylene and adhesion promoter, one skin layer of polar resin on the cast roll side, and the opposite skin layer of a terpolymer sealant on the air knife side. The total thickness of the film after biaxial orientation is 70 G or 0.7 mil. The thickness of the respective polar and sealant skin layers after biaxial orientation is 3–5 G and 4–6 G. The core is a 70/30 blend of polypropylene and adhesion promoter, melt extruded at 450–550° F. where the propylene homopolymer is Fina 3270 and Mitsui Admer QF500A maleic anhydride-grafted polypropylene as the adhesion promoter. The polar skin is a 70/30 blend of EVOH and amorphous nylon melt extruded at 380–450° F. where the EVOH is Evalca G156 (48 mole % ethylene) and the amorphous nylon is Dupont Selar PA2072. The sealant skin is melt extruded at 400–480° F. and is a terpolymer sealant such as Sumitomo SPX78H8. No polyetheramine coating or layer was applied in the film structure. The resultant clear film was tested for properties and was then metallized by vapor deposition of aluminum under vacuum to an optical density of 2.3 and tested for properties.

The barrier and adhesion properties of the Examples and Comparative Examples ("CEx.") are shown in Table 1.

TABLE 1

| Example | O2TR[1] Clear Film | O2TR[1] Metallized Film | PHAE Adhesion % peel-off | Metal Adhesion % peel-off | Wetting Tension dynes/cm |
|---|---|---|---|---|---|
| 1 | 12.2 | 2.0 | 0 | 0 | 48 |
| 2 | 13.2 | 0.63 | 0 | 0 | 48 |
| 3 | 12.7 | 1.2 | 0 | 0 | 46 |
| CEx. 1 | 2226 | 25 | NA | 50 | 41[3] |
| CEx. 2 | 80 | 1.86 | NA | 10 | 45[3] |
| CEx. 3 | 150 | 0.77 | 0[2] | 0 | 45[3] |

[1] O2TR in cc/m$^2$/day at 38° C./0% RH
[2] Adhesion of EVOH to core layer blended with adhesion promoter
[3] Discharge-treated surface The resultant clear films of Examples 1 and 3 provide excellent oxygen barrier with O2TR of 12 cc/m$^2$/day versus over 2000 cc/m$^2$/day for a typical OPP film without the polyetheramine layer. The metallized films of Examples 1 and 3 also exhibit excellent oxygen barrier of 2 cc/m$^2$/day or less versus 25 cc/m$^2$/day for Comparative Example 1. Similarly, Example 2 also shows exceptionally good results in comparison to Comparative Example 2, particularly for the unmetallized clear film. As can be seen, barrier properties of Example 1 and Example 3 compare favorably with Comparative Example 3, with clear film gas barrier properties of the polyetheramine being far superior to that of EVOH. Additionally, it can be seen that Examples 1 and 2 show better metal adhesion results than their respective Comparative Examples 1 and 2. Furthermore, the polar skin adhesion of Example 1 and 2's polyetheramine is extremely good in comparison to Counter Example 3's EVOH which requires an adhesion promoter such as anhydride-grafted polyolefin. Lastly, Table 1 shows that the untreated wetting tension of the polyetheramine layers are as high or higher than that of the Comparative Examples' treated surfaces.

Test Methods

The various properties in the above examples were measured by the following methods:

Oxygen transmission rate of the film was measured by using a Mocon Oxtran 2/20 unit substantially in accordance with ASTM D3985. In general, the preferred value was an average value equal to or less than 15.5 cc/m$^2$/day with a maximum of 46.5 cc/m$^2$/day.

Moisture transmission rate of the film was measured by using a Mocon Permatran 3/31 unit measured substantially in accordance with ASTM F1249. In general, the preferred value was an average value equal to or less than 0.155 g/m$^2$/day with a maximum of 0.49 g/m$^2$/day.

Optical density was measured using a Tobias Associates model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

Polar skin adhesion was measured by adhering a strip of 1-inch wide 610 tape to the polar skin surface of a single sheet of film and removing the tape from the surface. The amount of polar skin removed was rated qualitatively as follows:

Good =0–10% metal or PHAE removed.
Fair =11–30% metal or PHAE removed.
Poor =>30% metal or PHAE removed.
In general, preferred values were Good to Fair.
Appearance was rated qualitatively on the presence of cracks on the surface of the film.

Surface chemistry of the discharge-treated surface was measured using ESCA surface analysis techniques. A Physical Electronics model 5700Sci X-ray photoelectron/ESCA spectrometer was used to quantify the elements present on the sample surface. Analytical conditions used a monochromatic aluminum x-ray source with a source power of 350 watts, an exit angle of 50°, analysis region of 2.0 mm×0.8 mm, a charge correction of C—(C,H) in C 1s spectra at 284.6 eV, and charge neutralization with electron flood gun. Quantitative elements such as O, C, N were reported in atom %.

Wetting tension of the surfaces of interest was measured substantially in accordance with ASTM D2578-67. In general, the preferred value was an average value equal to or more than 40 dyne/cm with a minimum of 38 dyne/cm.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A laminate film comprising a polyetheramine resin-containing layer on a first polyolefin resin-containing layer having a functional group, wherein the laminate film has substantially zero percent peel-off.

2. The laminate film of claim 1, wherein the polyetheramine resin-containing layer is directly on the first polyolefin resin-containing layer.

3. The laminate film of claim 1, wherein there is no tie layer between the polyetheramine resin-containing layer and the first polyolefin resin-containing layer.

4. The laminate film of claim 1, further comprising a second polyolefin resin-containing layer on the first polyolefin resin-containing layer.

5. The laminate film of claim 1, wherein the polyetheramine resin is a copolymer of bis-phenol A diglycidyl ether and resorcinol diglycidyl ether with ethanolamine.

6. The laminate film of claim 1, wherein the first polyolefin resin-containing layer comprises a propylene homopolymer.

7. The laminate film of claim 4, wherein the second polyolefin resin-containing layer comprises a heat sealable polyolefin selected from the group consisting of propylene copolymers, terpolymers, polyethylene and combinations thereof.

8. The laminate film of claim 7, wherein the heat sealable layer comprises an antiblock component selected from the group consisting of amorphous silicas, aluminosilicates, sodium calcium aluminum silicate, a crosslinked silicone polymer, and polymethylmethacrylate.

9. The laminate film of claim 1, wherein the first polyolefin resin-containing layer is a discharge-treated polyolefin resin-containing layer.

10. The laminate film of claim 4, wherein the second polyolefin resin-containing layer comprises a winding layer comprising a crystalline polypropylene and an inorganic antiblocking agent.

11. The laminate film of claim 4, wherein the second polyolefin resin-containing layer comprises a winding layer comprising a matte layer of a block copolymer blend of polypropylene and one or more other polymers, the matte layer having a roughened surface.

12. The laminate film of claim 10, wherein the winding layer is a discharge treated winding layer having a surface for lamination or coating with adhesives or inks.

13. The laminate film of claim 10, wherein the winding layer comprises an antiblock component selected from the group consisting of amorphous silicas, aluminosilicates, sodium calcium aluminum silicate, a crosslinked silicone polymer, and polymethylmethacrylate.

14. The laminate film of claim 1, wherein the polyetheramine resin-containing layer is a discharge-treated polyetheramine resin-containing layer.

15. The laminate film of claim 14, wherein the discharge-treated polyetheramine resin-containing layer has a discharge-treated surface formed in an atmosphere of $CO_2$ and $N_2$.

16. The laminate film of claim 1, further comprising a vacuum deposited metal layer on the polyetheramine resin-containing layer.

17. The laminate film of claim 16, wherein the metal layer has a thickness of about 5 to 100 nm.

18. The laminate film of claim 16, wherein the metal layer has an optical density of about 1.5 to 5.0.

19. The laminate film of claim 16, wherein the metal layer comprises aluminum.

20. The laminate film of claim 1, wherein the laminate film is an extruded laminate film.

21. A laminate film comprising a polyetheramine resin-containing layer on a first polyethylene terephthalate resin-containing layer having a functional group, wherein the laminate film has substantially zero percent peel-off.

22. The laminate film of claim 21, wherein the polyetheramine resin-containing layer is directly on the first polyethylene terephthalate resin-containing layer.

23. The laminate film of claim 21, wherein there is no tie layer between the polyetheramine resin-containing layer and the first polyethylene terephthalate resin-containing layer.

24. The laminate film of claim 21, further comprising a second polyethylene terephthalate resin-containing layer or an amorphous copolyester layer on the first polyethylene terephthalate resin-containing layer.

25. The laminate film of claim 21, wherein the polyetheramine resin is a copolymer of bis-phenol A diglycidyl ether and resorcinol diglycidyl ether with ethanolamine.

26. The laminate film of claim 21, wherein the second polyethylene terephthalate resin-containing layer comprises an antiblock component selected from the group consisting of amorphous silicas, aluminosilicates, sodium calcium aluminum silicate, a crosslinked silicone polymer, and polymethylmethacrylate.

27. The laminate film of claim 21, wherein the first polyethylene terephthalate resin-containing layer is a discharge-treated polyethylene terephthalate resin-containing layer.

28. The laminate film of claim 26, wherein the second polyethylene terephthalate resin-containing layer is a discharge treated layer having a surface for lamination or coating with adhesives or inks.

29. The laminate film of claim 21, wherein the polyetheramine resin-containing layer is a discharge-treated polyetheramine resin-containing layer.

30. The laminate film of claim 29, wherein the discharge-treated polyetheramine resin-containing layer has a discharge-treated surface formed in an atmosphere of $CO_2$ and $N_2$.

31. The laminate film of claim 21, further comprising a vacuum deposited metal layer on the polyetheramine resin-containing layer.

32. The laminate film of claim 31, wherein the metal layer has a thickness of about 5 to 100 nm.

33. The laminate film of claim 31, wherein the metal layer has an optical density of about 1.5 to 5.0.

34. The laminate film of claim 31, wherein the metal layer comprises aluminum.

35. The laminate film of claim 21, wherein the laminate film is an extruded laminate film.

36. The laminate film of claim 24 wherein the second polyethylene terephthalate resin containing layer or the amorphous copolyester layer comprises an antiblock component selected from the group consisting of amorphous silicas, aluminosilicates, sodium calcium aluminum silicate, a crosslinked silicone polymer and polymethylmethacrylate.

37. A method for flexible packaging comprising obtaining a laminate film comprising a polyetheramine resin-containing layer on a first polyolefin resin-containing layer having a functional group, wherein the laminate film has substantially zero percent peel-off, and surrounding a product by the laminate film.

38. The method of claim 37, wherein the product is a food product.

39. A method for flexible packaging comprising obtaining a laminate film comprising a polyetheramine resin-containing layer on a polyethylene terephthalate resin-containing layer having a functional group, wherein the laminate film has substantially zero percent peel-off, and surrounding a product by the laminate film.

40. The method of claim 39, wherein the product is a food product.

41. A laminate film comprising a polyetheramine resin-containing layer on a mixed resin layer comprising a polyethylene terephthalate resin and a polyolefin resin, the mixed resin having a functional group, wherein the laminate film has substantially zero percent peel-off.

42. The laminate film of claim 41 further comprising a compatibilizer.

43. The laminate film of claim 41, further comprising an antiblock component.

44. The laminate film of claim 1, further comprising a metal-containing layer on the polyetheramine resin-containing layer.

* * * * *

(12) EX PARTE REEXAMINATION CERTIFICATE (9556th)
United States Patent
Su et al.

(10) Number: US 7,163,727 C1
(45) Certificate Issued: Mar. 12, 2013

(54) MULTI-LAYER BARRIER FILM STRUCTURE

(75) Inventors: Tien-Kuei Su, Saunderstown, RI (US); Keunsuk P. Chang, North Kingstown, RI (US)

(73) Assignee: Toray Plastics (America), Inc., North Kingstown, RI (US)

Reexamination Request:
No. 90/009,788, Sep. 1, 2010

Reexamination Certificate for:
Patent No.: 7,163,727
Issued: Jan. 16, 2007
Appl. No.: 10/690,709
Filed: Oct. 23, 2003

(51) Int. Cl.
*B29D 22/00* (2006.01)
(52) U.S. Cl. ............... 428/35.7; 428/36.92; 428/384

(58) Field of Classification Search ............ None
See application file for complete search history.

(56) References Cited

To view the complete listing of prior art documents cited during the proceeding for Reexamination Control Number 90/009,788, please refer to the USPTO's public Patent Application Information Retrieval (PAIR) system under the Display References tab.

*Primary Examiner* — Jerry D Johnson

(57) ABSTRACT

A laminate film comprising a polyetheramine resin-containing layer on a first polyolefin resin-containing layer or a first polyethylene terephthalate resin-containing layer is disclosed. The laminate film could further have additional layers such as a second polyolefin resin-containing layer, a second polyethylene terephthalate resin-containing layer, a metal layer or combinations thereof.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-40 and 44 are cancelled.

Claims 41-43 were not reexamined.

* * * * *